United States Patent [19]

Loff

[11] Patent Number: 5,501,724

[45] Date of Patent: Mar. 26, 1996

[54] COATING COMPOSITION FOR ATTENUATING REFLECTION OF ELECTROMAGNETIC RADIATION

[76] Inventor: Howard Loff, 21888 Westchester Rd., Shaker Heights, Ohio 44122

[21] Appl. No.: 260,880

[22] Filed: Jun. 16, 1994

[51] Int. Cl.$^6$ .................. C09D 5/32; C09G 1/16
[52] U.S. Cl. .................. 106/10; 106/3; 106/11; 106/272; 106/455; 252/587; 427/160; 523/503; 524/204; 524/236; 342/1; 342/2; 342/5; 342/6; 342/7; 342/8; 342/9; 342/10
[58] Field of Search .................. 252/587; 427/160; 106/455, 3, 11, 10, 272; 523/503; 524/204, 236; 342/1, 2, 5, 6, 7, 8, 9, 10, 11

[56] References Cited

U.S. PATENT DOCUMENTS 3,440,257  4/1969  Susi et al. .................. 252/587
4,425,161  1/1984  Shibahashi et al. .................. 106/21 R
5,154,759  10/1992  Cifuentes et al. .................. 106/10

OTHER PUBLICATIONS

The Printing Ink Manual; Leach et al, ed., pp. 140–141, 210, 218, 230, 250–252, 265, 266, 278, 284; 1993, no month.

*Primary Examiner*—C. Melissa Bonner
*Attorney, Agent, or Firm*—Benesch, Friedlander, Coplan & Aronoff

[57] ABSTRACT

A coating composition for the attenuation of the reflection electromagnetic radiation and particularly electromagnetic radiation have a wavelength of greater than 800 nm including the near infrared is described. The composition comprises a chromophore capable of absorbing up to about 95% of the electromagnetic radiation having a wavelength greater than 800 nm. Optionally, the composition may comprise microbeads that serve the purpose of also scattering the electromagnetic radiation.

34 Claims, No Drawings

COATING COMPOSITION FOR ATTENUATING REFLECTION OF ELECTROMAGNETIC RADIATION

FIELD OF THE INVENTION

This invention relates to new coating compositions of matter which are suitable for use on reflective surfaces and to the method for attenuating the reflection of electromagnetic radiation from such surface and to retarding the degradative effects on such surfaces. More particularly, the coating compositions of the present invention comprise a chromophore capable of absorbing electromagnetic radiation having a wavelength preferably in the range of 800 nm or greater and further optionally comprising microbeads capable of a scattering electromagnetic radiation having a wavelength of 800 nm or greater.

BACKGROUND OF THE INVENTION

Coating compositions for application to reflective surfaces, particularly to the exterior of motor vehicles have been widely used for years. For example, car waxes and polishes have been in use almost since the inception of mass production of automobiles for protecting the paint finish on the exterior as well as giving the surface a new car look and shine. Likewise, coatings and paints for metal surfaces such as aluminum siding and aluminum frame windows and the like have been developed to not only protect the surface of the metal but to cut down on reflection or a glare. There have also been coatings developed for the surfaces of glass, shiny metal or glass surfaces and the like in order to protect the surface of these materials, and to filter out certain wavelengths of electromagnetic radiation or eliminating the transmission of and/or reducing the reflection of such electromagnetic radiation. Such coatings also serve the purpose of protecting the surface from external damage by scratching or other "mechanical-type" damage as well as the deterioration or degradation of the surface by exposure to electromagnetic radiation.

Coating compositions have also been developed to attenuate laser light as well as microwave radiation such as radar, particularly for military aircraft. Such coating compositions are exemplified in U.S. Pat. Nos. 5,271,872; 5,134,296; 4,606,848; 4,414,339 and 4,173,018. For the most part, the coating compositions disclosed in these patents are for very specialized applications, some require the incorporation of magnetizable particles and are mixed into the compositions and thus having drawbacks to their broad spectrum application as well as employing relatively expensive components to formulate these compositions.

SUMMARY OF THE INVENTION

It has been discovered, in accordance with the present invention, a novel coating composition for attenuating the reflection of electromagnetic radiation having a wavelength of greater than 800 nm from a surface wherein the composition comprises a chromophore capable of absorbing up to about 95% of the impinging electromagnetic radiation having a wavelength greater than 800 nm.

Further, in accordance with the present invention, it is found that a composition having chromophores of the general formula

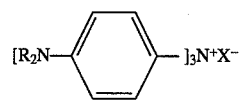

wherein R is an alkyl of from 1–5 carbon atoms and $X^-$ is an anion selected from the group consisting of hexafluoroantimonate and hexafluoroarsenate are very effective in absorbing and attenuating the reflection of electromagnetic radiation having a wavelength greater than 800 nm.

Still further in accordance with the present invention, it has been discovered that the attenuation of the reflection of such electromagnetic radiation having a wavelength greater than 800 nm may be improved by further employing microspheres or beads having a diameter effective for scattering electromagnetic radiation having a wavelength greater than 800 nm.

Still further in accordance with the present invention a coating composition is provided that is effective for retarding the degradative effects of electromagnetic radiation having a wavelength of greater than 800 nm and for attenuating the reflection of said electromagnetic radiation from a surface wherein said composition comprises:

(A) a polymer binder;
(B) natural and/or synthetic waxes;
(C) water;
(D) optionally one or more organic solvents;
(E) an effective amount of emulsifiers; and
(F) a chromophore capable of effecting the absorption of up to about 95% of said electromagnetic radiation.

Still further in accordance with the present invention, a method is provided for attenuating the reflection of electromagnetic radiation having a wavelength greater than 800 nm from a reflective surface comprising applying to such a surface or substrate a coating composition comprising a chromophore capable of absorbing up to about 95% of the electromagnetic radiation having a wavelength of greater than 800 nm.

Still further in accordance with the present invention, it is found that the coating composition of the present invention is effective for reducing glare, inhibiting the deterioration of any underlying coatings by electromagnetic radiation having a wavelength of greater than 800 nm and, in particular, for attenuating the reflection of laser light having a wavelength of 904 nm. The composition of the present invention may be formulated, for example, as a wax or polish for applying to the exterior surface of motor vehicles and may be so formulated as a high gloss, no-rub, quick drying polish.

These and other aspects of the invention will become clear to those skilled in the art upon the reading and understanding of the specification.

DETAILED DESCRIPTION OF THE PREFERRED EMBODIMENTS

It has been discovered that chromophores of the general formula

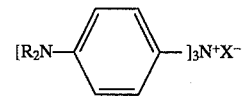

wherein R is an alkyl of from 1–5 carbon atoms and $X^-$ is an anion selected from the group consisting of hexafluoroantimonate and hexafluoroarsenate are highly effective infrared absorbers and in addition are heat stable. The infrared (IR) or near IR region of the electromagnetic spectrum is generally considered to represent wavelengths of greater than 800 nm. It has been further discovered that, for the purposes of the present invention, tris (P-diethylaminophenyl) aminium hexafluoroantimonate is the preferred compound chromophore to be admixed with the compositions of the present invention. The compounds described above may be formulated with wax and polish compositions to be applied to the exteriors of motor vehicles and the like to inhibit the reflection of electromagnetic radiation having wavelengths of greater than 800 nm and preferably wavelengths of about 850 nm to about 950 nm and in one embodiment a wavelength of 904 nm.

For surfaces such as the exterior of motor vehicles or glass and the like, it is desirable to filter out and/or scatter radiations of the infrared region or near IR without materially diminishing the transmission of visible radiations. This fact is particularly true for the purpose of absorbing laser light from a motor vehicle speed detecting gun.

The compound chromophores according to the present invention have been suggested for incorporation into a polymer matrix that may be utilized, for example, as lenses for sunglasses, lenses for welder's goggles and protective filters for windows and television. These applications are described in U.S. Pat. No. 3,341,464. There is, however, no disclosure teaching the use of such compounds in waxes, polishes and similar coatings that may be applied to the exterior surfaces of motor vehicles or other such reflective surfaces. It has been discovered that the chromophores described above and similar ones which absorb electromagnetic radiation in the region of 800 nm or longer wavelength and preferably in the wavelength range of about 850 nm to about 950 nm and that exhibit good heat stability may be formulated with various wax and/or polish compositions to be applied to the reflective surfaces of motor vehicles, buildings and the like which are exposed to sunlight, including the near infrared light. Glare is also reduced so as not to provide a problem to the operators of motor vehicles as well as individuals having a sensitivity to reflected light.

The filter coating compositions according to the present invention are developed and formulated for general commercial applications as opposed to the paint composition requiring very specific and often expensive components for application on military aircraft as described in U.S. Pat. Nos. 5,271,872 and 4,606,848.

In general, the coating compositions according to the present invention, in addition to the above-identified chromophores, comprise:

(A) from about 5 to about 60% by weight of a polymer binder;

(B) up to about 25% by weight of natural and/or synthetic waxes;

(C) up to about 30% by weight of water;

(D) up to about 25% by weight of mineral spirits or other similar organic solvents;

(E) an effective amount of emulsifiers and plasticizers;

(F) up to about 20% by weight of viscosity modifiers and/or fillers;

(G) optionally a effective amount of cross-linking agents; and (H) up to 15% by weight of microbeads having a diameter effective for scattering electromagnetic radiation having a wavelength of greater than 800 nm.

The polymer binders may include reaction products of unsaturated anhydrides, for example, maleic, citraconic, ethylmaleic, itaconic, glutaconic and the like, with polyols, for example, ethylene glycol, diethylene glycol, hexamethyleneglycol, pentaerythritol and the like; acrylic and methacrylic acids coupled with the alkanols of 1 to 8 carbon atoms, to form the oligmers, polymers and copolymers thereof and further including the copolymers with acrylamide, methylacrylamide, acrylonitrile and the like. The polymer binders may further include such polymers and copolymers as polyurethanes, polyesters and polyamides.

With respect to suitable cross-linking agents that may be employed for accelerating and initiating the curing of the polymer binders, free-radical producing agents capable of forming reactive sites may be utilized in the compositions according to the present invention. For example, such agents may including peroxides, hydroperoxides, etc., for example benzoyl peroxide, acetyl peroxide, tert-butyl peroxide, diamyl peroxide and the like. Other sources of free radicals may also be employed, for example, inorganic peroxy compounds such as persulfates and azo compounds of the general formula R–N=N–R such as azobenzene.

Mineral spirits that may be employed in the compositions of the present invention include liquids having boiling points in the range of about 250° to about 400° F., terpenes and other similar solvents having similar molecular weight and boiling points. These and similar solvents may or may not be utilized in the compositions of the present invention depending upon the specific components of the desired composition and the specific end use of the composition.

The waxes that may be employed include both natural and/or synthetic waxes, for example, carnauba wax, montan wax, paraffin wax, polyethylene waxes, ouricury wax, microcrystalline waxes, polypropylene waxes, and wax substitutes such as Fischer-Tropsch Wax.

Emulsifiers that may be employed in the compositions according to the present invention include nonionic and anionic surfactants. Such nonionic surfactants include ethoxylated alkanols and ethoxylated aliphatic monocarboxcylic acids. Preferably, anionic surfactants are alkali metal salts of sulfated derivatives of alkanols of 6–18 carbon atoms, ethoxylated alkanols having a degree of ethoxylation of from 4 to 30 and like materials. Suitable plasticizers include carboxylic esters, such as octyl hydroxybenzoates, e.g., 2-ethylhexyl p-hydroxybenzoate, dicarboxylic esters, such as dioctyl adipates, the corresponding phthalic esters or phosphoric esters, such as tri-n-butyl phosphate and octyl diphenyl phosphates.

The microbeads that may be optionally employed in the compositions of the present invention are effective in scattering electromagnetic radiation having a wavelength of greater than 800 nm and preferably a wavelength in the range of about 850 nm to about 950 nm. The microbeads employed may be those used in the coating industry and are derived from such polymers as polystyrene and polymethylmethacrylate and include the copolymers thereof and mixtures thereof.

Various fillers, thickeners, viscosity modifiers and thixotropic agents may also be employed in the compositions of the present invention and may include silicon and silicon based materials, carboxymethylcellulose, casein and the like.

The above discussed components may be blended and formulated by a number of different techniques and manners. However, in general, the resin binder, wax, any thixotropic agents, emulsifiers and dispersing agents are dissolved/dispersed in the solvent/emulsion system to form an emulsion and/or paste. To this initial emulsion are admixed the chromophore, optional cross-linking agents, optional microbeads and any other optional additives. If necessary, the mixture may be further diluted with water. This composition may then be packaged for distribution.

The following examples will serve to illustrate the formulation of compositions according to the present invention. These examples are for illustrative purposes only where the scope of the invention is defined in the appended claims.

| Polish Formulation | |
|---|---|
| Weight in grams | Material |
| 1.0 | tris (p-diethylaminophenyl) aminium hexafluoroantimonate |
| 3.0 | isopropyl maleate/Fischer Tropsch wax/ di-t-butyl peroxide reaction product |
| 3.6 | Silicone (5000 cs. visc./Linde L-41) |
| 3.6 | Oleic Acid |
| 1.7 | Morpholine |
| 67.5 | Mineral spirits (boiling point 275–325° F.) |
| 40.0 | Water |

The wax components, silicone and oleic acid are dissolved in the mineral spirits and combined with water to form the emulsion. The remaining components are then blended in the emulsion to form a polish for automobile surfaces.

EXAMPLE 2

The formulation of Example 1 is prepared except that a polymer comprised of:

35% by weight of n-butyl acrylate,

30% by weight of styrene,

25% by weight of methylmethacrylate, 1.5% by weight of methylolmethacrylomide and 8.5% by weight of acrylic acid is substituted for the isproply maleate of Example 1 and carnauba wax is substituted for the Fischer Tropsch wax.

The formula for the polish composition of Examples 1 and 2 provide good high-gloss polishes of the no-rub, quick-drying type. It is noted that silicone polishes require a thorough cleaning of the surface of application for best results. The resultant finish is high-gloss. However, it is highly effective for absorbing electromagnetic radiation of greater than 800 nm and specifically laser light having a wavelength of 904 nm. [Upon testing these polishes, a less than the detectable percentage of laser light having a wavelength of 904 nm is reflected back to the detector.] The testing involves coating a metal surface with the compositions of Examples 1 and 2 to which a 904 nm laser is projected and any reflection is measured by a conventional detector.

While the invention has been described in relation to preferred embodiments, it is to be understood that various modifications thereof will become apparent to those skilled in the art upon reading the specification. Therefore, it is to be understood that the invention disclosed herein is intended to cover such modification as fall within the scope of the claims that follow.

I claim:

1. A coating composition for attenuating reflection of electromagnetic radiation having a wavelength greater than 800 nm from a surface, said composition comprising a chromophore capable of absorbing about 95% of said electromagnetic radiation and a polymer binder wherein said polymer binder is selected from the group consisting of reaction products of unsaturated anhydrides with polyols; oligomers, polymers, and copolymers of acrylic and methacrylic acids coupled with alkanols of 1 to 8 carbon atoms; polyurethanes, polyesters, polyamides, and combinations thereof and wherein said coating composition is a polish composition.

2. The coating composition of claim 1 wherein said coating composition is effective for attenuating the reflection of electromagnetic radiation having a wavelength of about 850 nm to about 950 nm.

3. The coating composition according to claim 1 wherein said coating composition is effective for inhibiting greater than about 95% reflection of electromagnetic radiation having a wavelength of about 904 nm.

4. The coating composition according to claim 1 wherein said chromophore is a compound represented by the formula

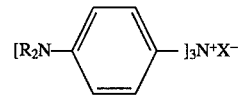

wherein R is an alkyl of from 1 to 5 carbon atoms and X is an anion selected from the group consisting of hexafluoroantimonate and hexafluoroarsenate.

5. The coating composition of claim 4 wherein said chromophore is tris (p-diethylaminophenyl) aminium hexafluoroantimonate.

6. The coating composition of claim 1 wherein said coating composition further comprises:

natural and/or synthetic waxes;

water; and an effective amount of emulsifiers.

7. The coating composition of claim 6 wherein said coating composition comprises:

from about 5% to about 60% by weight of a polymer binder;

up to about 25% by weight of natural and/or synthetic waxes;

up to about 30% by weight of water;

up to about 25% by weight of organic solvents; and a chromophore capable of effecting the absorption of about 95% of said electromagnetic radiation.

8. The coating composition of claim 6 wherein said wax component is selected from the group consisting of carnauba wax, montan wax, paraffin wax, polyethylene waxes, ouricury wax, microcrystalline waxes, polypropylene waxes, and wax substitutes such as Fischer-Tropsch Wax.

9. The coating composition of claim 6 wherein said coating composition further comprises a cross-linking agent for accelerating and initiating curing of the polymer binder.

10. The coating composition of claim 9 wherein said composition further comprises up to about 15% microbeads having a diameter effective for scattering said electromagnetic radiation.

11. The coating composition of claim 10 wherein said microbeads are derived from the group consisting of polystyrene, polymethylmethacrylate, copolymers of polystryene and polymethylmethacrylate, and mixtures thereof.

12. A coating composition for attenuating reflection of electromagnetic radiation having a wavelength greater than 800 nm from a surface, said composition comprising a chromophore capable of absorbing about 95% of said electromagnetic radiation, a polymer binder, and a cross-linking agent for accelerating and initiating curing of the polymer binder, and wherein said coating composition is a polish composition.

13. The coating composition of claim 12 wherein said coating composition is effective for attenuating the reflection of electromagnetic radiation having a wavelength of about 850 nm to about 950 nm.

14. The coating composition according to claim 12 wherein said coating composition is effective for inhibiting greater than about 95% reflection of electromagnetic radiation having a wavelength of about 904 nm.

15. The coating composition according to claim 12 wherein said chromophore is a compound represented by the formula

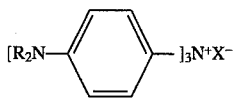

wherein R is an alkyl of from 1 to 5 carbon atoms and X is an anion selected from the group consisting of hexafluoroantimonate and hexafluoroarsenate.

16. The coating composition of claim 15 wherein said chromophore is tris (p-diethylaminophenyl) aminium hexafluoroantimonate.

17. The coating composition of claim 12 wherein said coating composition further comprises:

natural and/or synthetic waxes;

water; and an effective amount of emulsifiers.

18. The coating composition of claim 17 wherein said coating composition comprises:

from about 5% to about 60% by weight of a polymer binder;

up to about 25% by weight of natural and/or synthetic waxes;

up to about 30% by weight of water;

up to about 25% by weight of organic solvents; and a chromophore capable of effecting the absorption of about 95% of said electromagnetic radiation.

19. The coating composition of claim 17 wherein said polymer binder is selected from the group consisting of reaction products of unsaturated anhydrides with polyols; oligomers, polymers, and copolymers of acrylic and methacrylic acids coupled with alkanols of 1 to 8 carbon atoms; polyurethanes, polyesters, polyamides, and combinations thereof.

20. The coating composition of claim 17 wherein said wax component is selected from the group consisting of carnauba wax, montan wax, paraffin wax, polyethylene waxes, ouricury wax, microcrystalline waxes, polypropylene waxes, and wax substitutes such as Fischer-Tropsch Wax.

21. The coating composition of claim 18 wherein said composition further comprises up to about 15% microbeads having a diameter effective for scattering said electromagnetic radiation.

22. The coating composition of claim 21 wherein said microbeads are derived from the group consisting of polystryene, polymethylmethacrylate, copolymers of polystryene and polymethlmethacrylate, and mixtures thereof.

23. A coating composition effective for retarding degradative effects of electromagnetic radiation having a wavelength greater than 800 nm and for attenuating reflection of said electromagnetic radiation from a surface wherein said coating composition is a polish composition, said coating composition comprising:

(a) a polymer binder, said polymer binder being a compound other than a wax (b) natural and/or synthetic waxes;

(c) water;

(d) an effective amount of emulsifiers; and (e) a chromophore capable of effecting the absorption of about 95% of said electromagnetic radiation.

24. The coating composition of claim 23 wherein said coating composition comprises:

(a) from about 5% to about 60% by weight of a polymer binder;

(b) up to about 25% by weight of natural and/or synthetic waxes;

(c) up to about 30% by weight of water;

(d) up to about 25% by weight of organic solvents; and (e) a chromophore capable of effecting the absorption of about 95% of said electromagnetic radiation.

25. The coating composition of claim 23 wherein said polymer binder is selected from the group consisting of reaction products of unsaturated anhydrides with polyols; oligomers, polymers, and copolymers of acrylic and methacrylic acids coupled with alkanols of 1 to 8 carbon atoms; polyurethanes, polyesters, polyamides, and combinations thereof.

26. The coating composition of claim 23 wherein said wax component is selected from the group consisting of carnauba wax, montan wax, paraffin wax, polyethylene waxes, ouricury wax, microcrystalline waxes, polypropylene waxes, and wax substitutes such as Fischer-Tropsch Wax.

27. The coating composition of claim 23 wherein said coating composition further comprises a cross-linking agent for accelerating and initiating curing of the polymer binder.

28. The coating composition of claim 24 wherein said composition further comprises up to about 15% microbeads having a diameter effective for scattering said electromagnetic radiation.

29. The coating composition of claim 28 wherein said microbeads are derived from the group consisting of polystyrene, polymethylmethacrylate, copolymers of polystyrene and polymethylmethacrylate, or mixtures thereof.

30. A method for attenuating reflection of electromagnetic radiation having a wavelength greater than 800 nm from a surface comprising applying to said surface a coating composition comprising a chromophore capable of absorbing about 95% of said electromagnetic radiation and a polymer binder wherein said polymer binder is selected from the group consisting of reaction products of unsaturated anhydrides with polyols; oligomers, polymers, and copolymers of acrylic and methacrylic acids coupled with alkanols of 1 to 8 carbon atoms; polyurethanes, polyesters, polyamides, and combinations thereof.

31. The method of claim 30 wherein said chromophore is a compound represented by the formula

wherein R is an alkyl of from 1 to 5 carbon atoms and X is an anion selected from the group consisting of hexafluoroantimonate and hexafluoroarsenate.

32. The method of claim 31 wherein said chromophore comprises tris (p-diethylaminophenyl) aminium hexafluoroantimonate.

33. A method for retarding degradation effects of electromagnetic radiation having a wavelength greater than 800 nm and attenuating reflection of said electromagnetic radiation from a surface, said method comprising applying a coating of a uniform thickness of a coating composition to a surface, wherein said coating composition comprises:

(a) from about 5% to about 60% by weight of a polymer binder, said polymer binder being a compound other than a wax wherein said polymer binder is selected from the group consisting of reaction products of unsaturated anhydrides with polyols; oligomers, polymers, and copolymers of acrylic and methacrylic acids coupled with alkanols of 1 to 8 carbon atoms; polyurethanes, polyesters, polyamides, and combinations thereof;

(b) up to about 25% by weight of natural and/or synthetic waxes;

(c) up to about 30% by weight of water;

(d) up to about 25% by weight of organic solvents; and (e) a chromophore capable of effecting the absorption of about 95% of said electromagnetic radiation.

34. The method according to claim 33 wherein said electromagnetic radiation has a wavelength of 904 nm.

* * * * *